(12) United States Patent
Heystek et al.

(10) Patent No.: US 7,790,305 B2
(45) Date of Patent: Sep. 7, 2010

(54) GAS DIFFUSION LAYERS WITH INTEGRATED SEALS HAVING INTERLOCKING FEATURES

(75) Inventors: Joseph J. Heystek, Fenton, MI (US); Christian F. Fau, Northville, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 760 days.

(21) Appl. No.: 11/676,742

(22) Filed: Feb. 20, 2007

(65) Prior Publication Data

US 2008/0199761 A1  Aug. 21, 2008

(51) Int. Cl.
*H01M 10/34* (2006.01)
(52) U.S. Cl. .............................. 429/57; 429/35; 429/40
(58) Field of Classification Search ........................ None
See application file for complete search history.

(56) References Cited

U.S. PATENT DOCUMENTS

| 5,513,858 | A | 5/1996 | Deely et al. | |
|---|---|---|---|---|
| 2003/0051318 | A1* | 3/2003 | ErkenBrack | 24/428 |
| 2007/0003810 | A1* | 1/2007 | Heystek et al. | 429/35 |
| 2008/0241637 | A1* | 10/2008 | Burdzy | 429/36 |

* cited by examiner

*Primary Examiner*—Melvin C Mayes
*Assistant Examiner*—Sheng Han
(74) *Attorney, Agent, or Firm*—Ronald W. Wangerow; Harness, Dickey & Pierce, P.L.C.

(57) ABSTRACT

A membrane electrode assembly (MEA) is provided for a fuel cell and includes gas diffusion layers with integrated seals having interlocking features. The interlocking features of the gas diffusion layers allow the MEA to be constructed with a catalyst coated membrane between two gas diffusion layers with the integrated seals of the gas diffusion layers interlocking the gas diffusion layers together to complete the MEA.

7 Claims, 2 Drawing Sheets

GAS DIFFUSION LAYERS WITH INTEGRATED SEALS HAVING INTERLOCKING FEATURES

FIELD

The present disclosure relates to fuel cell gaskets and more particularly, to gas diffusion layers of a fuel cell being provided with integrated seals having interlocking features.

BACKGROUND AND SUMMARY

The statements in this section merely provide background information related to the present disclosure and may not constitute prior art.

Proton-exchange membrane (PEM) fuel cells are well known. In a PEM fuel cell, hydrogen atoms are ionized in an anode, migrate through a specialized membrane as hydrogen cations (protons), and combine with oxygen anions at a cathode to form water. Electrons from the hydrogen flow from the anode through an external circuit to the cathode, thereby creating usable electricity.

Fuel cell assemblies comprise a plurality of individual fuel cells stacked together and connected in electrical series. Each individual fuel cell typically includes a membrane electrode assembly (MEA) including a special membrane and having a gas diffusion layer on each side thereof. The MEA is sandwiched between bipolar plates that include gas flow channels formed in the surface thereof. Each individual fuel cell requires a seal or gasket along all outer edges and around all openings to prevent leaking of reactant gases and coolant. It is known to use separate die-cut or molded rubber gaskets, installed between the plates during assembly of a fuel cell stack. However, a serious problem exists in locating the gaskets properly with respect to the openings to be sealed. A misaligned gasket can cause leaks, stack failure, and even broken bipolar plates. Further, using separate gaskets adds significantly to the overall time of stack assembly.

The present disclosure provides an MEA with a seal that is integrally molded to the gas diffusion layers and are provided with interlocking features. A pair of gas diffusion layers with integrally molded seals are mated together with the interlocking features and a catalyst coated membrane therebetween to complete an MEA assembly.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
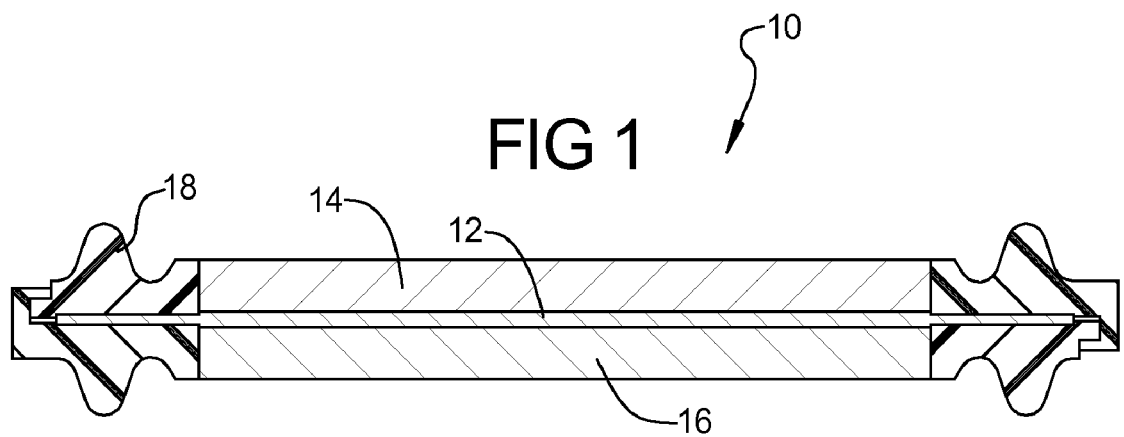
FIG. 1 is a schematic sectional view of an MEA assembly having seal integrated gas diffusion layers with interlocking features according to the principles of the present invention.

The following description is merely exemplary in nature and is not intended to limit the present disclosure, application, or uses. It should be understood that throughout the drawings, corresponding reference numerals indicate like or corresponding parts and features.

Figure 2:
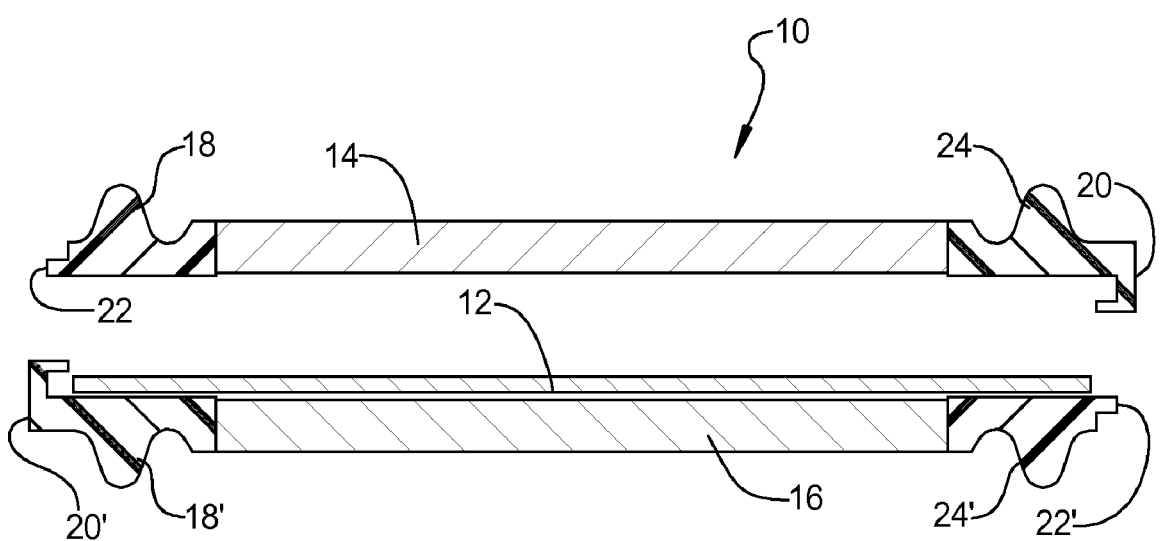
FIG. 2 is an exploded schematic view of the MEA assembly of FIG. 1 illustrating the assembly of the seal integrated gas diffusion layers.

With reference to FIGS. 1 and 2, a membrane electrode assembly (MEA), according to the principles of the present disclosure, will now be described. The MEA 10 includes a catalyst coated membrane 12 disposed between a first gas diffusion layer 14 and a second gas diffusion layer 16. Each of the gas diffusion layers 14, 16 is provided with an integrally formed seal 18 extending around the perimeter thereof. The seal 18 can be integrally molded to the gas diffusion layers 14, 16 or otherwise adhered thereto. The integrally formed seal 18 is provided with interlocking features designed to interlock with corresponding interlocking features of the integrated seal 18' provided on the second gas diffusion layer 16. The integrated seal 18 is provided with a female locking feature 20 which can be in the form of a hook-shaped edge 20 or can have other forms. The integrally formed seal 18 also includes a male locking feature 22 which can be in the form of a free edge adapted to be received within the hook shaped locking feature 20 of the opposing integrally formed seal 18' of the second gas diffusion layer 16. Other interlocking features can include and are not limited to any "male" shape that can be pressed into or otherwise engaged with a "female" opening and can be held via interference.

Figure 3:
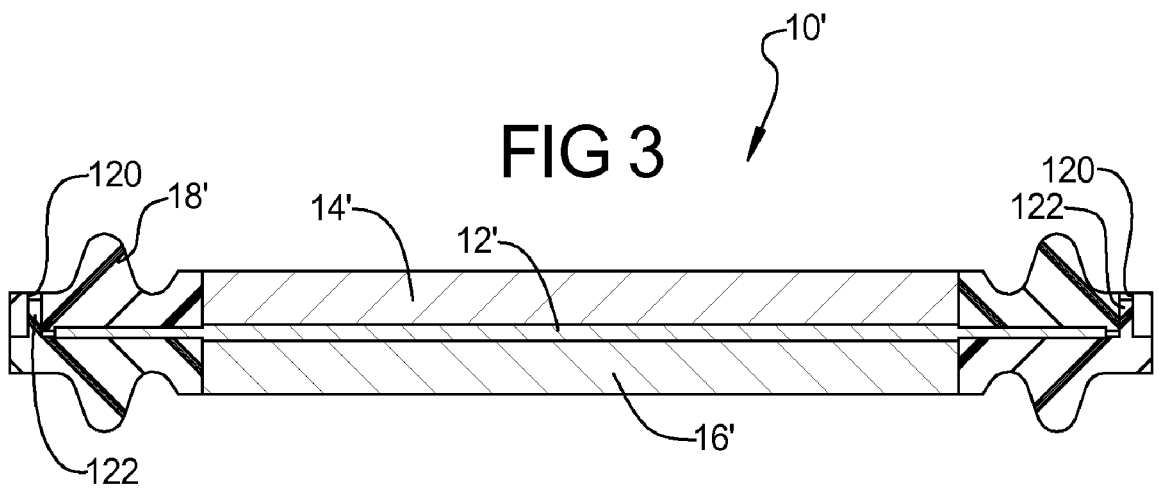
FIG. 3 is a schematic sectional view of an MEA assembly having seal integrated gas diffusion layers with interlocking features according to a second embodiment of the present invention.

As illustrated in FIG. 3, the interlocking features can include a male post 122 and a female hole 120 for receiving the post 122. In the embodiment of FIG. 3, the second gas diffusion layer 16' is shown with two posts 122 that are received in corresponding holes provided in the first gas diffusion layer 14'.

Figure 4:
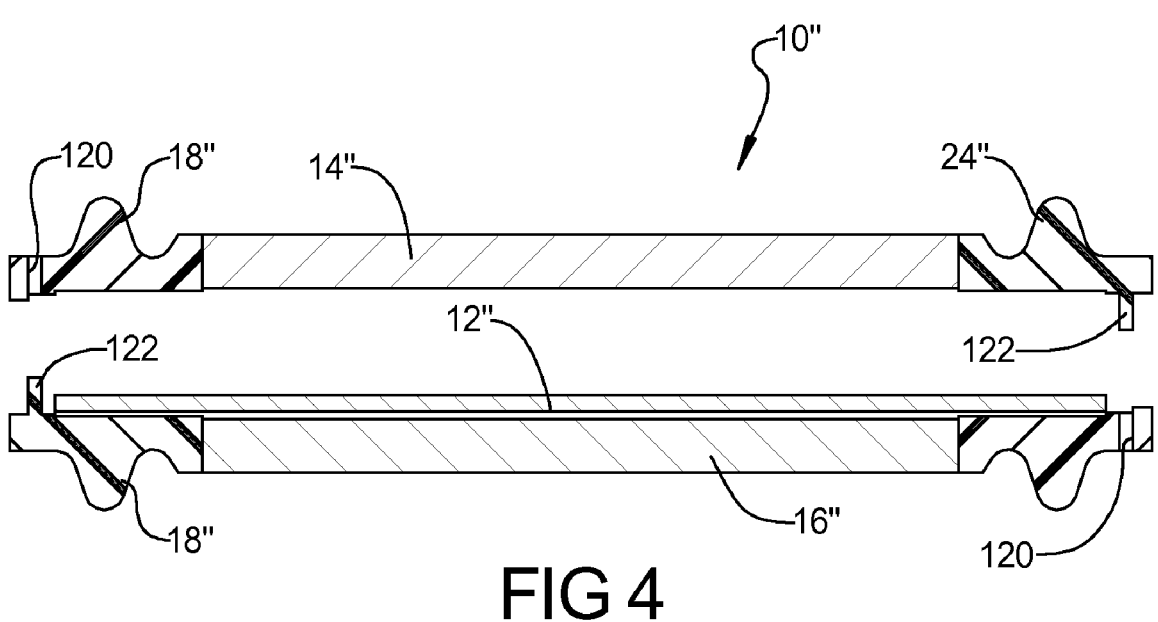
FIG. 4 is an exploded schematic view of an MEA assembly according to a third embodiment.

In the embodiment shown in FIG. 4, the first and second gas diffusion layers are provided with a symmetrical design so that a single mold cavity can be used to make both components which are turned 180 degrees and engaged with one another. In particular, the interlocking features include male posts 122' and female holes 120' on each gas diffusion layer 14", 16" that correspond with corresponding interlocking features on the other layer.

The interlocking features can be rubber or insert molded rigid plastic/metal in construction. The integrally formed seal 18, 18' of the first and second gas diffusion layers 14, 16, respectively, are each provided with seal beads 24 to provide an appropriate seal between the bipolar plates of a fuel cell stack.

In order to assemble the MEA 10, the catalyst coated membrane 12 is placed on top of one of the gas diffusion layers 16, as illustrated in FIG. 2, and a second gas diffusion layer 14 is brought downward onto the catalyst coated membrane 12 and the interlocking features 20, 20' and 22, 22' on each of the integrally formed seals 18, 18' are brought into engagement with one another so as to provide a completed MEA assembly.

It should be understood that the interlocking features can be made in numerous forms and can either be around the entire perimeter of the integrated seals 18, or provided in specific locations. In addition, the interlocking features can be used as locating features for alignment of the catalyst coated membrane 12 for building the MEA. The design of the present disclosure removes the catalyst coated membrane from any molding operation, thus eliminating the catalyst coated membrane scrap that can occur if the molding operation is not satisfactory. Furthermore, the interlocking features of the integrally formed seals can eliminate the need to otherwise adhere or heat stake the MEA components (gas diffusion layers, catalyst coated membrane) together.

What is claimed is:

1. A membrane electrode assembly for use in a fuel cell, comprising:
    a first gas diffusion layer having a first seal extending around a perimeter thereof;
    a second gas diffusion layer having a second seal extending around a perimeter thereof, said first and second seals including integrally molded interlocking features that engage one another; and
    a catalyst coated membrane disposed between said first and second gas diffusion layers, said catalyst coated membrane being disposed in a plane, at least one of said integrally molded interlocking features of said first and second seals intersecting said plane.

2. The membrane electrode assembly according to claim 1, wherein said integrally molded interlocking features include a hook-shaped edge portion on each of said first and second seals.

3. The membrane electrode assembly according to claim 2, wherein said first and second seals lockingly engage one another via a free edge portion of said first and second seals being received within a corresponding hook-shaped edge portion of an opposing one of said first and second seals.

4. The membrane electrode assembly according to claim 1, wherein said first and second seals each include a first edge portion with a male locking feature and a second edge portion with a female locking feature, wherein said male locking feature of each of said first and second seals is received by said female locking feature of said other of said first and second seals.

5. The membrane electrode assembly according to claim 1, wherein said first and second seals include a seal bead disposed around a perimeter of said first and second gas diffusion layers, respectively.

6. The membrane electrode assembly according to claim 1, wherein said integrally molded interlocking features include at least one male post on one of said first and second seals and a corresponding female hole on the other of said first and second seals.

7. The membrane electrode assembly according to claim 6, wherein said first and second seals have identical configurations which engage one another when turned 180 degrees out of phase with one another.

* * * * *